United States Patent [19]

Seng et al.

[11] 3,957,779

[45] May 18, 1976

[54] BENZO-1,2,4-TRIAZINES

[75] Inventors: Florin Seng, Schildgen; Kurt Ley, Odenthal-Gloebusch; Karl Georg Metzger, Wuppertal-Elberfeld, all of Germany

[73] Assignee: Bayer Aktiengesellschaft, Germany

[22] Filed: Nov. 8, 1973

[21] Appl. No.: 413,887

[30] Foreign Application Priority Data
Nov. 15, 1972 Germany............................ 2255947
Nov. 15, 1972 Germany............................ 2255946

[52] U.S. Cl. ...................... 260/249.5; 260/247.5 C; 424/249
[51] Int. Cl.² ........................................ C07D 253/08
[58] Field of Search .................. 260/249.5, 247.5 C

[56] References Cited
OTHER PUBLICATIONS
Mason et al., *J. Chem. Soc.* (B) 1970(5) pp. 911–916.

*Primary Examiner*—John M. Ford

[57] ABSTRACT

Benzo-1,2,4-triazines-1,4-di-N-oxides substituted in the 3-position with a substituted amino group and optionally substituted in the benzo ring are antimicrobial agents. The compounds, of which 3-(N-acetoacetylamino)benzo-1,2,4-triazine-1,4-di-N-oxide is a typical embodiment, are prepared from the corresponding 2-aminobenzo-1,2,4-triazine-1,4-di-N-oxide through alkylation or acylation.

34 Claims, No Drawings

BENZO-1,2,4-TRIAZINES

DETAILED DESCRIPTION

The present invention relates to benzo-1,2,4-triazines and their production, to pharmaceutical compositions useful for the treatment of bacterial infections in humans and animals using said compounds as the active ingredient, to feedstuff additives and to the use of said compounds as growth promotants for use with animals.

More particularly, the benzo-b 1,2,4-triazines of the present invention are of the benzo-

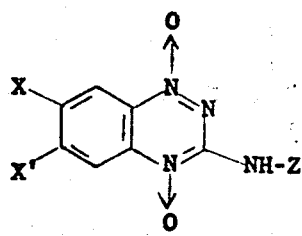   I wherein

X and X' are the same or different, and each is selected from the group consisting of hydrogen; alkyl of 1 to 6 carbon atoms, unsubstituted or substituted by one or more, preferably 1 to 3 and especially 1 or 2, of the same or different substituents selected from the group consisting of alkoxy of 1 to 4 carbon atoms, especially 1 or 2 carbon atoms, haloalkyl of 1 to 4 carbon atoms and especially 1 or 2 carbon atoms in the alkyl moiety and 1 to 5, espcially 1 to 3, of the same or different halogen atoms, particularly fluorine, chlorine or bromine, and nitro; alkoxy of 1 to 6 carbon atoms, especially 1 to 4 carbon atoms, unsubstituted or substituted by one or more, preferably 1 to 3 and especially 1 to 2, of the same or different substituents selected from the group consisting of alkyl of 1 to 4 carbon atoms, especially 1 or 2 carbon atoms, haloalkyl of 1 to 4 carbon atoms, especially 1 or 2 carbon atoms in the alkyl moiety, and 1 to 5, especially 1 to 3, of the same or different halogen atoms preferably fluorine, chlorine or bromine, halogen preferably fluorine, chlorine or bromine and especially chlorine or bromine, and nitro; haloalkyl of 1 to 4 and especially 1 or 2 carbon atoms in the alkyl moiety and 1 to 5, especially 1 to 3, of the same or different halogen atoms especially fluorine, chlorine or bromine; and halogen preferably fluorine, chlorine or bromine, and Z is R, —CO—$R_1$, —CO—$CH_2$—CO—$CH_3$, —CO—NH—$R_2$, or

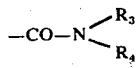

wherein

R is alkyl of 1 to 6 carbon atoms, especially 1 to 4 carbon atoms, unsubstituted or substituted by one or more, preferably 1 to 3 and especially 1 or 2, of the same or different substituents selected from the group consisting of alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, especially fluorine, chlorine or bromine, halogen preferably fluorine, chlorine or bromine and especially chlorine or bromine, and nitro; alkenyl of 2 to 6 carbon atoms, especially 2 to 4 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, haloalkyl of 1 to 4 carbon atoms, especially 1 or 2 atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; or aralkyl of 6 to 10 carbon atoms in the aryl moiety and 1 to 4 carbon atoms, especially 1 or 2 carbon atoms, in the alkyl moiety, unsubstituted or substituted by one or more, preferably 1 to 3 and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, especially fluorine, chlorine or bromine, halogen preferably fluorine, chlorine or bromine and especially chlorine or bromine, and nitro;

$R_1$ is hydrogen; alkyl of 1 to 17 carbon atoms, preferably 1 to 6 carbon atoms, unsubstituted or substituted by one or more, preferably 1 to 3 and especially 1 or 2, of the same or different substituents selected from the group consisting of alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; or aryl of 6 to 10 carbon atoms, unsubstituted or substituted by one or more, preferably 1 to 3, and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3 of the same or different halogen atoms, preferably fluorine, chlorine or bromine, halogen preferably fluorine, chlorine or bromine and especially chlorine or bromine, and nitro; and $R_2$ is alkyl of 1 to 6 carbon atoms, especially 1 to 4 carbon atoms, unsubstituted or substituted by one or more, preferably 1 to 3 and especially 1 or 2, of the same or different substituents selected from the group consisting of alkoxy of 1 to 4 carbon atoms, especially 1 or 2 carbon atoms, haloalkyl of 1 to 4 carbon atoms, especially 1 or 2 carbon atoms, in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; mono-, bi- or tricyclic cycloalkyl of 3 to 10 carbon atoms, especially monocycloalkyl of 5 or 6 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, particularly fluorine, chlorine or bromine, halogen preferably fluorine, chlorine or bromine and especially chlorine or bromine, and nitro; or aryl of 6 to 10 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro;

$R_3$ and $R_4$ are the same or different and each is selected from the group consisting of hydrogen; alkyl of 1 to 12 carbon atoms, preferably 1 to 6 carbon atoms and especially 1 to 4 carbon atoms, unsubstituted or substituted by one or more, preferably 1 to 3 and especially 1 or 2, of the same or different substituents selected from the group consisting of alkoxy of 1 to 4 carbon atoms and especially of 1 or 2 carbon atoms, hydroxy, the same or different halogen atoms, cyano, monoalkylamino of 1 to 4 carbon atoms and especially 1 or 2 carbon atoms, dialkylamino of 1 to 4 carbon atoms and especially 1 or 2 carbon atoms in each alkyl moiety, and carbalkoxy of 2 to 4 carbon atoms, especially 2 or 3 carbon atoms; alkenyl of 2 to 6 carbon atoms, especially 2 to 4 carbon atoms, unsubstituted or substituted by one or more, preferably 1 to 3 and especially 1 or 2, of the same or different substituents selected from the group consisting of alkoxy of 1 to 4 carbon atoms and especially of 1 or 2 carbon atoms, hydroxy, the same or different halogen atoms, cyano, monoalkylamino of 1 to 4 carbon atoms and especially 1 or 2 carbon atoms, dialkylamino of 1 to 4 carbon atoms and especially 1 or 2 carbon atoms in each alkyl moiety, and carbalkoxy of 2 to 4 carbon atoms, especially 2 or 3 carbon atoms; and mono-, bi- and tricyclic cycloalkyl of 3 to 10 carbon atoms, especially 3, 5 or 6 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms alkoxy of 1 to 4 carbon atoms and especially of 1 or 2 carbon atoms, hydroxy, the same or different halogen atoms, cyano, monoalkylamino of 1 to 4 carbon atoms and especially 1 or 2 carbon atoms, dialkylamino of 1 to 4 carbon atoms and especially 1 or 2 carbon atoms in each alkyl moiety, and carbalkoxy of 2 to 4 carbon atoms, especially 2 or 3 carbon atoms; or $R_3$ and $R_4$, together with the nitrogen atom to which they are attached, form a 5- to 7-membered, preferably 5- or 6-membered, saturated or unsaturated heterocyclic ring wherein the nitrogen atom is the only heteroatom or wherein said ring also contains 1 to 3 and preferably 1 substituent selected from the group consisting of oxygen, sulfur or $SO_2$, and nitrogen or N-alkyl of 1 to 4 carbon atoms and especially 1 or 2 carbon atoms. The 6-membered heterocyclic rings preferably contain a heteroatom or hetero-group in the p-position to the amide nitrogen atom.

As used in the specification, alkyl and alkoxy include both the straight and branched chain moieties.

The benzo-1,2,4-triazines of the present invention are particularly useful for their antimicrobial activity and particularly their broad spectrum antibacterial activity. The compounds exhibit activity against both Gram-positive and Gram-negative bacteria and thus are useful in combatting a broad spectrum of bacterial infections in humans and animals, are useful as animal feedstuffs, and are useful for their growth promoting effect in animals.

According to one embodiment of the present invention, the compounds may be named as 3-amino-benzo-1,2,4-triazine-1,4-di-N-oxides of the formula:

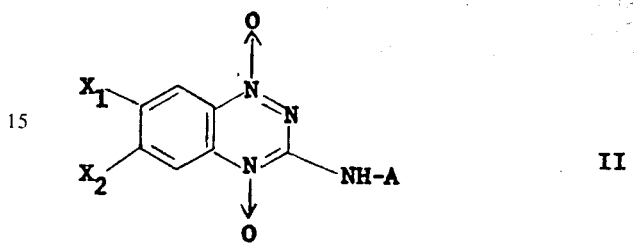

II wherein $X_1$ and $X_2$ are the same or different, and each is selected from the group consisting of hydrogen; alkyl of 1 to 6 carbon atoms, unsubstituted or substituted by one or more, preferably 1 to 3 especially 1 or 2, of the same or different substituents selected from the group consisting of alkoxy of 1 to 4 carbon atoms, especially 1 or 2 carbon atoms, haloalkyl of 1 to 4 carbon atoms and especially 1 or 2 carbon atoms in the alkyl moiety and 1 to 5, especially 1 to 3, of the same or different halogen atoms, particularly fluorine, chlorine or bromine, and nitro; alkoxy of 1 to 6 carbon atoms, especially 1 to 4 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, haloalkyl of 1 to 4 carbon atoms, especially 1 or 2 carbon atoms in the alkyl moiety, and 1 to 5, especially 1 to 3, of the same or different halogen atoms preferably fluorine, chlorine or bromine, halogen preferably fluorine, chlorine or bromine and especially chlorine or bromine, and nitro; haloalkyl of 1 to 4 and especially 1 or 2 carbon atoms in the alkyl moiety and 1 to 5, especially 1 or 3, of the same or different halogen atoms especially fluorine, chlorine or bromine; and halogen preferably fluorine, chlorine or bromine, and A is R, $-CO-R_1$, $-CO-CH_2-CO-CH_3$, or $-CO-NH-R_2$ wherein R is alkyl of 1 to 6 carbon atoms, especially 1 to 4 carbon atoms, unsubstituted or substituted by one or more, preferably 1 to 3 and especially 1 or 2, of the same or different substituents selected from the group consisting of alkoxy of 1 to 4 carbon atoms, especially 1 to 2 carbon atoms, haloalkyl of 1 to 4 carbon atoms, especially 1 or 2 carbon atoms in the alkyl moiety and 1 to 5, especially 1 to 3, of the same or different halogen atoms, especially fluorine, chlorine or bromine, halogen preferably fluorine, chlorine or bromine and especially chlorine or bromine, and nitro; alkenyl of 2 to 6 carbon atoms, especially 2 to 4 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; or aralkyl of 6 to 10 carbon atoms in the aryl moiety and 1 to 4 carbon atoms, especially 1 or 2 carbon atoms, in the alkyl moiety, unsubstituted or substituted by one or more, preferably 1 to 3 and especially 1 to 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, especially fluorine, chlorine or bromine, halogen preferably fluorine, chlorine or bromine and especially chlorine or bromine, and nitro;

$R_1$ is hydrogen; alkyl of 1 to 17 carbon atoms, preferably 1 to 6 carbon atoms, unsubstituted or substituted by one or more, preferably 1 to 3 and especially 1 or 2, of the same or different substituents selected from the group consisting of alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; or aryl of 6 to 10 carbon atoms, unsubstituted or substituted by one or more, preferably 1 to 3, and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; and $R_2$ is alkyl of 1 to 6 carbon atoms, especially 1 to 4 carbon atoms, unsubstituted or substituted by one or more, preferably 1 to 3 and especially 1 or 2, of the same or different substituents selected from the group consisting of alkoxy of 1 to 4 carbon atoms, especially 1 or 2 carbon atoms, haloalkyl of 1 to 4 carbon atoms, especially 1 or 2 carbon atoms, in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro; mono-, bi- or tricyclic cycloalkyl of 3 to 10 carbon atoms, especially monocycloalkyl of 5 or 6 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, particularly fluorine, chlorine or bromine, halogen preferably fluorine, chlorine or bromine and especially chlorine or bromine, and nitro; or aryl of 6 to 10 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, alkoxy of 1 to 4 carbon atoms, especially 1 or 2 carbon atoms, haloalkyl of 1 to 4 carbon atoms, especially 1 or 2 carbon atoms in the alkyl moiety and 1 to 5, especially 1 to 3, of the same or different halogen atoms, preferably fluorine, chlorine or bromine, halogen preferably fluorine, chlorine or bromine and especially chlorine or bromine, and nitro.

These compounds may be produced by (a) alkylating a compound of the formula:

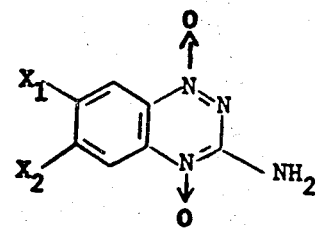

III wherein
$X_1$ and $X_2$ are as above defined, with a compound of the formula:

R — Y    IV wherein
R is as above defined; and
Y is a labile moiety which is split off during the alkylation reaction either in the presence or in the absence of an acid-binding agent;

b. acylating a compound of the formula:

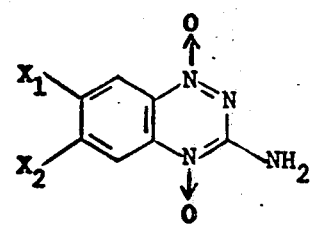

III wherein
$X_1$ and $X_2$ are as above defined,
with a ketone, diketone or a compound of the formula:

$R_1$ — CO —Z    V wherein
$R_1$ is as above defined, and
Z is a labile moiety which is split off during the acylation reaction either in the presence or in the absence of an acid-binding agent; or c. reacting a compound of the formula:

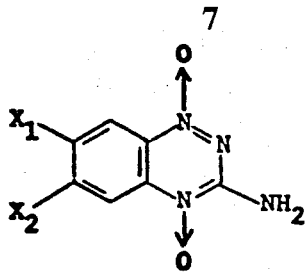

III wherein
X₁ and X₂ are as above defined, with an isocyanate of the formula:

R₂ — NCO    VI wherein
R₂ is as above defined.

If for example 3-amino-benzo-1,2,4-triazine-1,4-di-N-oxide and dimethyl sulphate are used as starting compounds, the course of the reaction can be represented by the following equation (1) (Process Variant (a)):

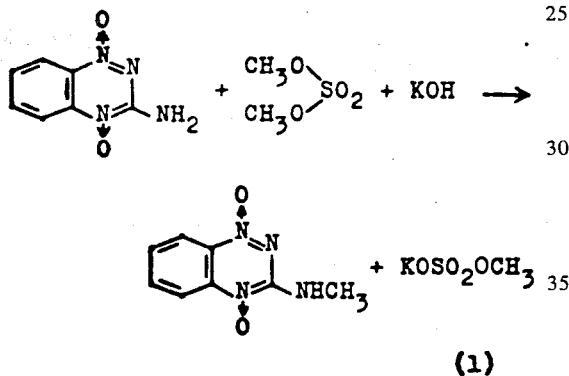

(1)

If for example 3-amino-benzo-1,2,4-triazine-1,4-di-N-oxide and acetic anhydride, benzoyl chloride and diketene are used as starting compounds, the course of the reaction can be represented by the following equations (2) – (4) (Process Variant (b)):

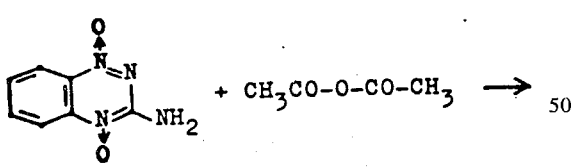

(2)

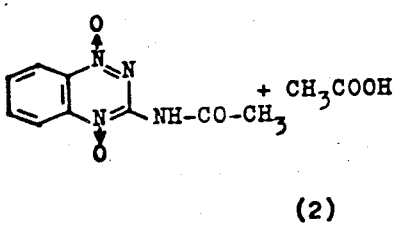

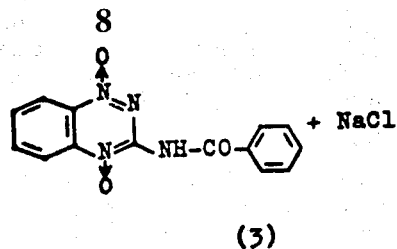

(3)

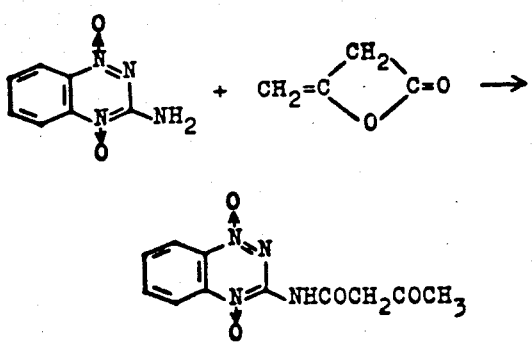

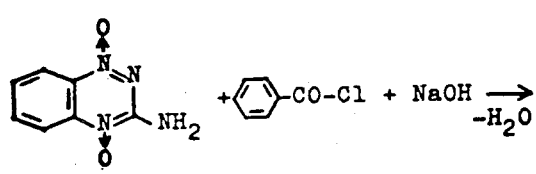

(4)

If for example 3-amino-benzo-1,2,4-triazine-1,4-di-N-oxide and methylisocyanate are used as starting compounds, the course of the reaction can be represented by the following equation (5) (Process Variant (c)):

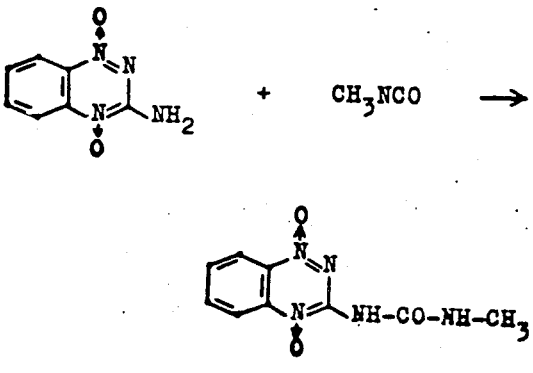

(5)

According to a further embodiment of the present invention, and alkyl moieties of X₁ and X₂, R and R₂ are methyl, ethyl, n-propyl, i-propyl, n-butyl, i-butyl or t-butyl, unsubstituted or substituted as described above. The alkenyl moiety of R is ethenyl, propenyl-(1), propenyl-(2), or butenyl-(3), unsubstituted or substituted as described above. The cycloalkyl moiety R₂ is cyclopentyl, cyclohexyl, cycloheptyl, bicyclo[2,2,1]heptyl or bicyclo[2,2,2]octyl, unsubstituted or substituted as described above. The alkyl moiety R₁ is methyl, ethyl, n-propyl, i-propyl, n-butyl, i-butyl, t,butyl, n-octyl, n-decyl or heptadecyl, unsubstituted or substituted as described above. The alkoxy moieties of X₁ and X₂ are methoxy, ethoxy, n-propoxy, i-propoxy, n-butoxy, i-butoxy or t-butoxy, unsubstituted or substituted as described above. The aryl moieties of R₁ and R₂ are preferably phenyl or naphthyl, unsubstituted or substituted as described above. The aralkyl moiety of R can either be substituted in the aryl moiety or in the alkyl moiety, or both, and preferably has 6 carbon atoms in the aryl moiety. Benzyl and phenethyl are preferred and these may be unsubstituted or substituted as described above.

According to a further embodiment of the present invention, $X_1$ and $X_2$ are the same or different, and each is selected from the group consisting of hydrogen; alkyl of 1 to 6 carbon atoms, unsubstituted or substituted by 1 or 2 of the same or different substituents selected from the group consisting of alkoxy of 1 to 4 carbon atoms, haloalkyl of 1 to 4 carbon atoms in the alkyl moiety and 1 to 5 of the same or different halogen atoms, and nitro; alkoxy of 1 to 6 carbon atoms, unsubstituted or substituted by 1 to 2 of the same or different substituents selected from the group consisting of alkyl of 1 to 4 carbon atoms, haloalkyl of 1 to 4 carbon atoms in the alkyl moiety and 1 to 5 of the same or different halogen atoms, halogen and nitro; haloalkyl of 1 to 4 carbon atoms in the alkyl moiety and 1 to 5 of the same or different halogen atoms; and halogen; and A is R, $-CO-R_1$, $-CO-CH_2-CO-CH_3$, or $-CO-NH-R_2$ wherein R is alkyl of 1 to 6 carbon atoms, unsubstituted or substituted by 1 or 2 of the same or different substituents selected from the group consisting of alkoxy of 1 to 4 carbon atoms, haloalkyl of 1 to 4 carbon atoms in the alkyl moiety and 1 to 5 of the same or different halogen atoms, halogen and nitro; alkenyl of 2 to 6 carbon atoms, unsubstituted or substituted by 1 or 2 of the same or different substituents selected from the group consisting of alkoxy of 1 to 4 carbon atoms, haloalkyl of 1 to 4 carbon atoms in the alkyl moiety and 1 to 5 of the same or different halogen atoms, halogen and nitro; and aralkyl of 6 to 10 carbon atoms in the aryl moiety and 1 to 4 carbon atoms in the alkyl moiety, unsubstituted or substituted by 1 or 2 of the same or different substituents selected from the group consisting of alkyl of 1 to 4 carbon atoms, alkoxy of 1 to 4 carbon atoms, haloalkyl of 1 to 4 carbon atoms in the alkyl moiety and 1 to 5 to the same or different halogen atoms, halogen and nitro;

$R_1$ is hydrogen; alkyl of 1 to 17 carbon atoms, unsubstituted or substituted by 1 or 2 of the same or different substituents selected from the group consisting of alkoxy of 1 to 4 carbon atoms, haloalkyl of 1 to 4 carbon atoms in the alkyl moiety and 1 to 5 of the same or different halogen atoms, halogen and nitro; or aryl of 6 to 10 carbon atoms, unsubstituted or substituted by 1 or 2 of the same or different substituents selected from the group consisting of alkyl of 1 to 4 carbon atoms, haloalkyl of 1 to 4 carbon atoms in the alkyl moiety and 1 to 5 of the same or different halogen atoms, halogen and nitro; and $R_2$ is alkyl of 1 to 6 carbon atoms, unsubstituted or substituted by 1 or 2 of the same or different substituents selected from the group consisting of alkoxy of 1 to 4 carbon atoms, haloalkyl of 1 to 4 carbon atoms in the alkyl moiety and 1 to 5 of the same or different halogen atoms, halogen and nitro; mono-, bi- or tricyclic cycloalkyl of 3 to 10 carbon atoms, unsubstituted or substituted by 1 or 2 of the same or different substituents selected from the group consisting of alkyl of 1 to 4 carbon atoms, alkoxy of 1 to 4 carbon atoms, haloalkyl of 1 to 4 carbon atoms in the alkyl moiety and 1 to 5 of the same or different halogen atoms, halogen and nitro; or aryl of 6 to 10 carbo atoms, unsubstituted or substituted by 1 or 2 of the same or different substituents selected from the group consisting of alkyl of 1 to 4 carbon atoms, alkoxy of 1 to 4 carbon atoms, haloalkyl of 1 to 4 carbon atoms in the alkyl moiety and 1 to 5 of the same or different halogen atoms, halogen and nitro.

According to a further embodiment of the present invention:

$X_1$ and $X_2$ are each hydrogen, or one is hydrogen and the other is alkyl of 1 to 4 carbon atoms, alkoxy of 1 to 4 carbon atoms, trifluoromethyl, chloro, bromo or fluoro;

A is R, $-CO-R_1$, $-CO-CH_2-CO-CH_3$, or $-CO-NH-R_2$ wherein

R is alkyl of 1 to 4 carbon atoms, alkenyl of 2 or 3 carbon atoms, or benzyl;

$R_1$ is hydrogen, alkyl of 1 to 17 carbon atoms, or phenyl; and $R_2$ is alkyl of 1 to 4 carbon atoms, or cyclohexyl.

According to a further embodiment of the present invention:

$X_1$ and $X_2$ are each hydrogen, or one is hydrogen and the other is methyl, ethyl, methoxy, ethoxy, trifluoromethyl or chloro;

A is R, $-CO-R_1$, $-CO-CH_2-CO-CH_3$, or $-CO-NH-R_2$ wherein

R is methyl, ethyl, allyl or benzyl;

$R_1$ is methyl, ethyl, heptadecyl or benzyl; and $R_2$ is methyl, ethyl or cyclohexyl.

According to a further embodiment of the present invention:

$X_1$ is hydrogen, methoxy, ethoxy, trifluoromethyl or chloro;

$X_2$ is hydrogen, methyl, methoxy, ethoxy or chloro;

A is alkyl of 1 to 4 carbon atoms, allyl, $-CO-R_1$ wherein $R_1$ is methyl, ethyl, heptadecyl or phenyl; or $-CO-NH-R_2$ wherein $R_2$ is methyl, ethyl or cyclohexyl.

According to a further embodiment of the present invention:

$X_1$ and $X_2$ are each hydrogen, and

A is methyl, $-CO-R_1$ wherein $R_1$ is methyl, ethyl, heptadecyl, chloromethyl, phenyl, nitrophenyl, dinitrophenyl, $-CO-CH_2-CO-CH_3$, or $-CO-NH-R_2$ wherein $R_2$ is methyl or cyclohexyl.

Y is preferably a halogen atom, particularly chlorine, bromine or iodine. Preferred alkylating agents R—Y include methyl iodide, allyl chloride and benzyl bromide.

Y according to another embodiment of the present invention is $-O-SO_2-OR'$ wherein R' is the same as R but is preferably an alkyl moiety, preferably of 1 to 6 carbon atoms and especially 1 to 4 carbon atoms. Representative examples include the dialkyl sulphates such as dimethyl sulphate and diethyl sulphate.

According to another embodiment of the present invention, Y is $-O-SO_2-R''$ wherein R'' is aryl, unsubstituted or substituted preferably by an alkyl moiety, for example phenyl or 4-phenylmethyl so that Y represents an arylsulphonic acid ester such as phenylsulphonic acid methyl ester or 4-methylphenylsulphonic acid methyl ester.

Z is preferably a halogen atom such as fluorine, chlorine or bromine and especially fluorine or chlorine so that acylating agent $R_1$—CO—Z is preferably an acid halide such as acetyl chloride. Other preferred acylating agents include those wherein Z is —O—CO—R''' wherein R''' is the same as $R_1$ so that the moiety is a carboxylic acid anhydride for example acetic anhydride.

The compounds of formula (III) which can be used according to the invention are known or can be produced by known processes (compare J. C. Mason and G. Tennant, J. Chem. Soc. London, B 1970, 711).

They can also be produced by reacting benzofuroxanes of the formula:

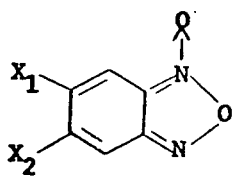

VII wherein $X_1$ and $X_2$ are as above defined, with a two-fold molar amount of disodium cyanamide in aqueous methanol at about 20°C to about 60°C, filtering off the compound of formula (III) which has precipitated in the crude form, dissolving the precipitate in water and acidifying the aqueous solution with acetic acid. The compounds of formula (III) separate out as crystals.

Representative compounds of the formula (III) include:

3-amino-benzo-1,2,4-triazine-1,4-di-N-oxide,
6-methyl-3-amino-benzo-1,2,4-triazine-1,4-di-N-oxide,
7-ethyl-3-amino-benzo-1,2,4-triazine-1,4-di-N-oxide,
6-methoxy-3-amino-benzo-1,2,4-triazine-1,4-di-N-oxide,
6-ethoxy-3-amino-benzo-1,2,4-triazine-1,4-di-N-oxide,
6-trifluoromethyl-3-amino-benzo-1,2,4-triazine-1,4-di-N-oxide,
7-chloro-3-amino-benzo-1,2,4-triazine-1,4-di-N-oxide,
6,7-dimethyl--3-amino-benzo-1,2,4-triazine-1,4-di-N-oxide,
6,7-dichloro-3-amino-benzo-1,2,4-triazine-1,4-di-N-oxide,
6,7-dimethoxy-3-amino-benzo-1,2,4-triazine-1,4-di-N-oxide, and
6,7-diethoxy-3-amino-benzo-1,2,4-triazine-1,4-di-N-oxide.

Representative compounds of formula (IV) include:
methyl iodide,
ethyl bromide,
benzyl chloride,
i-propyl chloride,
n-propyl iodide,
dimethyl sulphate,
diethyl sulphate,
di-n-propyl sulphate,
phenylsulphonic acid methyl ester, and
4-phenylsulphonic acid ethyl ester.

The starting compounds of the formula (V) are per se known or can be obtained according to the methods which are themselves known. Representative compounds include:
acetyl chloride,
propionyl bromide,
propionyl chloride,
butyric acid chloride,
valveric acid chloride,
hexanoic acid chloride,
cyclohexanoic acid chloride,
acetic anhydride, and
n-propionic anhydride.

The isocyanates of the formula (VI) are known per se or can be obtained according to procedures which are themselves known. Representative compounds include:
methyl isocyanate,
ethyl isocyanate,
n-propyl isocyanate, and
i-propyl isocyanate.

Preferred solvents include ethers (for example diethyl ether, dioxane and tetrahydrofuran), lower alkyl ketones (for example acetone and methyl ethyl ketone), lower dialkylformamides (for example dimethylformamide), aliphatic or aromatic hydrocarbons optionally carrying one or more halogen, lower alkyl or nitro radicals as substituents (for example methylene chloride, chloroform, carbon tetrachloride, nitromethane, hexane, heptane, benzene, toluene, the xylenes, chlorobenzene, dichlorobenzene and nitrobenzene), lower alkylnitriles (for example acetonitrile) and hetero-aromatic compounds (for example pyridine). It is also possible to use mixtures of these solvents with one another and, in cases in which the starting compounds employed are inert towards water, it is also possible additionally to use water. In many cases, a reactant present in excess (for example a carboxylic acid anhydride) can also be employed as the solvent.

Preferred acid-binding agents include alkali metal hydroxides and alkaline earth metal hydroxides, alkaline earth metal oxides, alkali metal carbonates and bicarbonates and alkaline earth metal carbonates and bicarbonates and tertiary aliphatic and aromatic amines, as well as heterocyclic bases. Sodium hydroxide, potassium hydroxide and calcium hydroxide, calcium oxide, sodium carbonate and potassium carbonate, sodium bicarbonate and potassium bicarbonate, triethylamine, diazabicyclo-nonene and diaza-bicyclo-undecene may be mentioned as examples.

The reaction temperatures in all Process Variants can be varied over a substantial range. In general, the reaction is carried out at between 0°C and 150°C, preferably between 20°C and 100°C. However, it is also possible to work below or above these temperatures.

The reaction may be carried out at atmospheric pressure or under super-atmospheric pressure. It is preferred that atmospheric pressure is used.

In carrying out the process according to the present invention, it is desirable to employ in each case about 1 to about 5, preferably 1 to 2, mols of the reactants of the formulae (IV), (V) or (VI) per 1 mol of the compound of the formula (III), and, in cases in which an acid is liberated, additionally to employ 1 to 10, preferably 1 to 2, mols of acid-binder. It is possible to deviate from the molar ratios mentioned, within wide ranges, without significantly impairing the result of the reaction.

In carrying out the process according to the present invention, the compound of formula (III) is usually dissolved or suspended in a diluent and the second reactant, of the formulae (IV), (V) or (VI), is added, in portions if appropriate, and together with the acid-binding agent, if used. The reactants can be added to the reaction vessel in any order. In most cases the end products of the formula (II) separate out in a crystalline form after a short time, if necessary after evaporation of the diluent. They can be isolated and purified according to customary methods, for example by recrystallization.

The following compounds are representative of the 3-amino-benzo-1,2,4-triazine-1,4-di-N-oxides:

3-(N-methylamino)-benzo-1,2,4-triazine-1,4-di-N-oxide,
3-(N-ethylamino)-benzo-1,2,4-triazine-1,4-di-N-oxide,
3-(N-n-propylamino)-benzo-1,2,4-triazine-1,4-di-N-oxide,
3-(N-i-propylamino)-benzo-1,2,4-triazine-1,4-di-N-oxide,
3(N-acetylamino)-benzo-1,2,4-triazine-1,4-di-N-oxide,
3-(N-n-propionylamino)-benzo-1,2,4-triazine-1,4-di-N-oxide,
3-(N-i-propionylamino)-benzo-1,2,4-triazine-1,4-di-N-oxide,
3-(N-benzoylamino)-benzo-1,2,4-triazine-1,4-di-N-oxide,
3-(N-stearylamino)-benzo-1,2,4-triazine-1,4-di-N-oxide,
3-(N-allylamino)-benzo-1,2,4-triazine-1,4-di-N-oxide,
6-methyl-3-(N-methylamino)-benzo-1,2,4-triazine-1,4-di-N-oxide,
7-methoxy-3-(N-methylamino)-benzo-1,2,4-triazine-1,4-di-N-oxide,
6,7-diethoxy-3-(N-methylamino)-benzo-1,2,4-triazine-1,4-di-N-oxide,
6,7-dichloro-3-(N-ethylamino)-benzo-1,2,4-triazine-1,4-di-N-oxide,
6,7-dimethoxy-3-(N-ethylamino)-benzo-1,2,4-triazine-1,4-di-N-oxide,
7-trifluoromethyl-3-(N-i-propylamino)-benzo-1,2,4-triazine-1,4-di-N-oxide,
1'-methyl-3'[1,4-dioxo-benzo-1,2,4-triazin-3-yl]-urea,
1'-cyclohexyl-3'-[1,4-dioxo-benzo-1,2,4-triazin-3-yl]-urea, and
1'-ethyl-3'-[1,4-dioxo-benzo-1,2,4-triazin-3-yl]-urea.

According to a further embodiment of the present invention, a class of compounds may be designated as 1,4-dioxo-benzo-1,2,4-triazin-1-yl ureas of the formula:

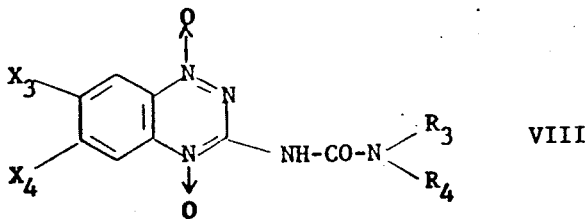

wherein
$X_3$ and $X_4$ are the same or different and each is selected from the group consisting of hydrogen; alkyl of 1 to 6 carbon atoms, especially 1 to 4 carbon atoms; alkoxy of 1 to 6 carbon atoms, especially of 1 to 4 carbon atoms, unsubstituted or substituted by one or more, preferably 1 to 3 and especially 1 or 2, of the same or different substituents selected from the group consisting of the same or different halogen atoms, preferably fluorine, chlorine and bromine and especially fluorine and chlorine; haloalkyl of 1 to 4 carbon atoms and especially 1 or 2 carbon atoms in the alkyl moiety and 1 to 5 halogen atoms, especially 1 to 3 halogen atoms, particularly fluorine, chlorine or bromine and especially fluorine or chlorine; and halogen, particularly fluorine, chlorine and bromine and especially fluorine and chlorine;

$R_3$ and $R_4$ are the same or different and each is selected from the group consisting of hydrogen; alkyl of 1 to 12 carbon atoms, preferably 1 to 6 carbon atoms and especially 1 to 4 carbon atoms, unsubstituted or substituted by one or more, preferably 1 to 3 and especially 1 or 2, of the same or different substituents selected from the group consisting of alkoxy of 1 to 4 carbon atoms and especially of 1 or 2 carbon atoms, hydroxy, the same or different halogen atoms, cyano, monoalkylamino of 1 to 4 carbon atoms and especially 1 or 2 carbon atoms, dialkylamino of 1 to 4 carbon atoms and especially 1 or 2 carbon atoms in each alkyl moiety, and carbalkoxy of 2 to 4 carbon atoms, especially 2 or 3 carbon atoms; alkenyl of 2 to 6 carbon atoms, especially 2 to 4 carbon atoms, unsubstituted or substituted by one or more, preferably 1 to 3 and especially 1 or 2, of the same or different substituents selected from the group consisting of alkoxy of 1 to 4 carbon atoms and especially of 1 or 2 carbon atoms, hydroxy, the same or different halogen atoms, cyano, monoalkylamino of 1 to 4 carbon atoms and especially 1 or 2 carbon atoms, dialkylamino of 1 to 4 carbon atoms and especially 1 or 2 carbon atoms in each alkyl moiety, and carbalkoxy of 2 to 4 carbon atoms, especially 2 or 3 carbon atoms; and mono-, bi- and tricyclic cycloalkyl of 3 to 10 carbon atoms, especially, 3, 5 or 6 carbon atoms, unsubstituted or substituted by one or more, preferably 1 to 3 and especially 1 or 2, of the same or different substituents selected from the group consisting of alkyl of 1 to 4 carbon atoms, especially 1 or 2 carbon atoms, alkoxy of 1 to 4 carbon atoms and especially of 1 or 2 carbon atoms, hydroxy, the same or different halogen atoms, cyano, monoalkylamino of 1 to 4 carbon atoms and especially 1 or 2 carbon atoms, dialkylamino of 1 to 4 carbon atoms and especially 1 or 2 carbon atoms in each alkyl moiety, and carbalkoxy of 2 to 4 carbon atoms, especially 2 or 3 carbon atoms; or $R_3$ and $R_4$, together with the nitrogen atom to which they are attached, form a 5- to 7-membered, preferably 5- or 6-membered, saturated or unsaturated heterocyclic ring wherein the nitrogen atom is the only heteroatom or wherein said ring also contains 1 to 3 and preferably 1 substituent selected from the group consisting of oxygen, sulfur or $SO_2$, and nitrogen or N-alkyl of 1 to 4 carbon atoms and especially 1 to 2 carbon atoms. The 6-membered heterocyclic rings preferably contain a heteroatom or hetero-group in the p-position to the amide nitrogen atom.

These 1,4-dioxo-benzo-1,2,4-triazin-1-yl ureas are produced by reacting

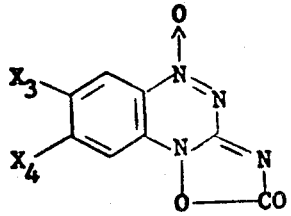

VIII

IX wherein
X₃ and X₄ are as above defined
with an amino compound of the formula:

wherein
R₃ and R₄ are as above defined
at a temperature of between 0°C and 150°C.

It is particularly surprising that the 1,4-dioxo-benzo-1,2,4-triazin-1-yl ureas are produced by the above reaction since such was clearly not foreseeable or predictable from the prior art and one could not therefore determine whether compounds (IX) and (X) would react and, if so, in what way the compounds would react with each other. In the above process, it is not the usually rather reactive >N—O— ring linkage in the compound of formula (IX) which s opened but, surprisingly, the —O—CO— ring linkage.

According to the above process, the 1,4-dioxo-benzo-1,2,4-triazin-1-yl ureas of the present invention are produced in a smooth reaction, in excellent yields, and are highly pure.

If 2-oxo[1,2,4-oxa-diazolo(2,3-3,4)benzo-1,2,4-triazine]-5-N-oxide and dimethylamine are used as starting compounds according to the process above described, the course of the reaction may be represented by the following equation:

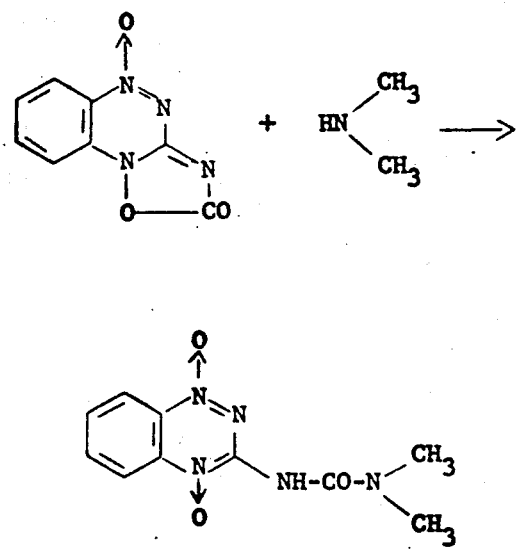

According to a further embodiment of the present invention:

X₃ and X₄ are the same or different and each is selected from the group consisting of hydrogen; alkyl of 1 to 4 carbon atoms; alkoxy of 1 to 4 carbon atoms, unsubstituted or substituted by 1 to 3 of the same or different substituents selected from the group consisting of fluorine, chlorine and bromine, haloalkyl of 1 or 2 carbon atoms in the alkyl moiety and 1 to 3 halogen atoms; and fluorine, chlorine or bromine;

R₃ and R₄ are the same or different and each is selected from the group consisting of hydrogen; alkyl of 1 to 6 carbon atoms, unsubstituted or substituted by 1 to 3 of the same or different substituents selected from the group consisting of alkoxy of 1 or 2 carbon atoms, hydroxy, the same or different halogen atoms, cyano, monoalkylamino of 1 or 2 carbon atoms, dialkylamino of 1 or 2 carbon atoms in each alkyl moiety, and carbalkoxy of 2 or 3 carbon atoms; alkenyl of 2 to 4 carbon atoms, unsubstituted or substituted by 1 to 3 of the same or different substituents selected from the group consisting of alkoxy of 1 or 2 carbon atoms, hydroxy, the same or different halogen atoms, cyano, monoalkylamino of 1 or 2 carbon atoms, dialkylamino of 1 or 2 carbon atoms in each alkyl moiety, and carbalkoxy of 2 or 3 carbon atoms; and cycloalkyl of 3, 5 or 6 carbon atoms, unsubstituted or substituted by 1 to 3 of the same or different substituents selected from the group consisting of alkyl of 1 or 2 carbon atoms, unsubstituted or substituted by 1 to 3 of the same or different substituents selected from the group consisting of alkoxy of 1 or 2 carbon atoms, hydroxy, the same or different halogen atoms, cyano, monoalkylamino of 1 or 2 carbon atoms, dialkylamino of 1 or 2 carbon atoms in each alkyl moiety, and carbalkoxy of 2 or 3 carbon atoms; or R₃ and R₄, together with the nitrogen atom to which they are attached, form a 5- or 6-membered saturated or unsaturated hetereocyclic ring or such ring which also contains 1 to 3 ring members selected from the group consisting of oxygen, sulfur or SO₂, and nitrogen or N-alkyl of 1 to 1 or 2 carbon atoms in the alkyl moiety.

According to a further embodiment of the present invention:

X₃ and X₄ are the same or different and are each selected from the group consisting of hydrogen; methyl, ethyl, and propyl, i-propyl, n-butyl, i-butyl, or t-butyl; methoxy, ethoxy, n-propoxy, i-propoxy, n-butoxy, i-butoxy or t-butoxy, unsubstituted or substituted by 1 or 2 of the same or different substituents selected from the group consisting of fluorine and chlorine; trifluorometyl; chlorodifluoromethyl; bromomethyl; 2,2,2-trifluoroethyl; pentafluoroethyl; fluorine and chlorine; and R₃ and R₄ are the same or different and each is selected from the group consisting of hydrogen; methyl, ethyl, n-propyl, i-propyl, n-butyl, i-butyl or t-butyl, unsubstituted or substituted by 1 or 2 of the same or different substituents selected from the group consisting of methoxy, ethoxy, n-propoxy, i-propoxy, n-butoxy, i-butoxy, t-butoxy,hydroxy, fluorine, chlorine, bromine, cyano, methylamino, methylethylamino, n-propylamino, i-propylamino, methyl-n-butylamino, carbomethoxy and carbethoxy; ethenyl, propen-1-yl, propen-2-yl or buten-3-yl, unsubstituted or substituted by 1 or 2 of the same or different substituents selected from the group consisting of methoxy, ethoxy, n-propoxy, i-propoxy, n-butoxy, i-butoxy, t-butoxy, hydroxy, fluorine, chlorine, bromine, cyano, methylamino, methylethylamino, n-propylamino, i-propylamino, methyl-n-butylamino, carbomethoxy and carbethoxy; and cyclopropyl, cyclobutyl, cyclopentyl, cyclohexyl, cycloheptyl, bicyclo[2,2,1]heptyl, bicyclo[2,2,2]octyl or adamantyl, unsubstituted or substituted by 1 or 2 of the same or different substituents selected from the group consisting of methyl, ethyl, n-propyl, i-propyl, n-butyl, i-butyl, t-butyl, methoxy, ethoxy, n-propoxy, i-propoxy, n-butoxy, i-butoxy, t-butoxy, hydroxy, fluorine, chlorine, bromine, cyano, methylamino, methylethylamino, n-propylamino, i- propylamino, methyl-n-butylamino, carbomethoxy and carbethoxy; or

R₃ and R₄, together with the nitrogen atom to which they are attached, form a pyrrolidine, piperidine, piperazine, hexamethyleneimine, morpholine or N-methylpiperazine ring.

According to a further embodiment of the present invention:

X₃ and X₄ are each hydrogen; and

R₃ and R₄ are the same or different and each is selected from the group consisting of hydrogen, methyl, ethyl, hydroxyethyl and cyclohexyl, or R₃ and R₄, together with the nitrogen atom to which they are attached, form a pyrrolidine, piperidine or morpholine ring.

According to a further embodiment of the present invention:

X₃ and X₄ are each hydrogen; and

R₃ and R₄ are each hydrogen, each methyl or one is hydrogen and the other is methyl, ethyl, hydroxyethyl or cyclohexyl, or R₃ and R₄, together with the nitrogen atoms to which they are attached, form a pyrrolidine, piperidine or morpholine ring.

The compounds of formula (IX) above which are used as starting compounds in the process of the present invention are not per se known but may be obtained according to the following process:

A compound of the formula:

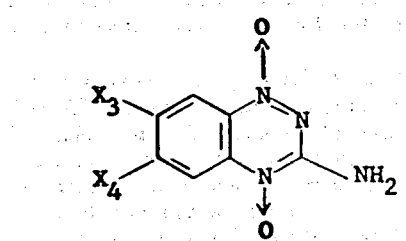

XI wherein

X₃ and X₄ are as above defined is reacted with approximately the stoichiometric amount of phosgene at a temperature between 20°C and 180°C, particularly between 80°C and 90°C, in the presence of an aliphatic or aromatic hydrocarbon as the diluent, for example toluene. The reaction product precipitates. This reaction may be represented by the following equation:

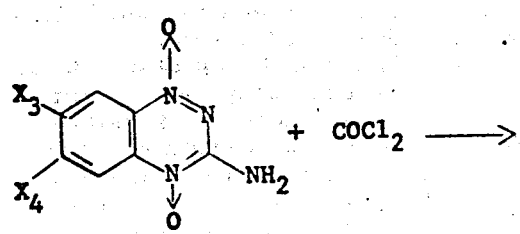

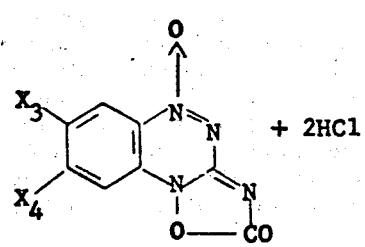

wherein

X₃ and X₄ are as above defined.

Representative compounds of those of formula (IX) include those set forth in the table below:

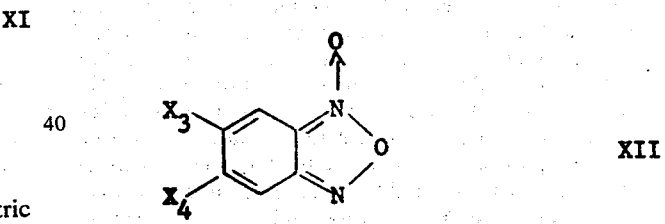

| X₃ | X₄ |
|---|---|
| H | H |
| H | Cl |
| Cl | Cl |
| CH₃ | H |
| CH₃ | CH₃ |
| CH₃O | H |
| Cl | H |
| CF₃ | H |

The compounds of formula (XI) which are used to produce the starting compounds used in the process of the present invention (compounds of formula (IX) are known or can be produced by processes per se known (compare J. C. Mason and G. Tennant, J. Chem. Soc. London, B 1970, 711).

These compounds can also be produced by reacting a benzofuroxane of the formula:

XII wherein

X₃ and X₄ are as above defined, with a preferably two-fold molar amount of disodium cyanamide in aqueous methanol at about 20°C to 60°C, filtering off the compound of formula (XI) which precipitates in a crude form, dissolving the precipitate in water and acidifying the aqueous solution with acetic acid. The compound of formula (XI) precipitates out as crystals.

The amino compounds of formula (X) which are used as starting compounds in the process above described are per se known. Representative amino compounds which may be used in the process of the present invention include:

ammonia
methylamine
ethylamine
n- and iso-propylamine
n-, iso- and tert.-butylamine
dodecylamine
allylamine
cyclohexylamine
ethanolamine 2-methoxy-ethylamine
dimethylamine
diethylamine
diakylamine
diethanolamine
ethyleneimine
pyrrolidine
piperidine
hexamethyleneimine
morpholine
thiamorpholine
4-methyltetrahydropyridine The process of the present invention may take place in the presence of a diluent. Inert organic solvents and water are particularly suitable diluents. Preferred diluents are polar organic solvents (for example, alcohols, especially alkanols having up to 6 carbon atoms, such as methanol, ethanol, n- and i-propanol and n-, i- and t-butanol), nitriles (preferably alkylnitriles having up to 6 carbon atoms, such as acetonitrile), dimethylformamide, ethers (for example dioxane and tetrahydrofuran), hetero-aromatic compounds (for example pyridine), and nitrobenzene, and mixtures of these solvents with one another. In some cases no additional diluent is necessary, the amine of the formula (X) serving as diluent.

The reaction is carried out at temperatures between 0°C and 150°C, preferably between 20°C and 80°C.

The reaction may be carried out at atmospheric pressure or at elevated pressure. Generally, atmospheric pressure is used.

In carrying out the process according to the invention, at least 1 mol, preferably 1 to 20, especially 2 to 5 mols of the amino compound of the formula (X) are employed per 1 mol of 2-oxo-[1,2,4-oxa-diazolo(2,3-3,4)benzo-1,2,4-triazine]-5-N-oxide of the formula (IX). If an excess of amine is used, the 1,4-dioxo-benzo-1,2,4-triazin-3-yl-urea compounds of the invention precipitate in the form of their ammonium salts. The compounds of the present invention (formula (VIII)) in the form of the free base is then obtained according to techniques per se known by treating the salts which precipitate with a suitable organic or inorganic acid, preferably of PKs $\leq$ 5. Suitable acids include aliphatic carboxylic acids having up to 6 carbon atoms (such as formic acid, acetic acid, trifluoroacetic acid and propionic acid), aliphatic and aromatic sulphonic acids (such as methanesulphonic acid, ethanesulphonic acid, benzenesulphonic acid and toluene sulphonic acid), hydrohalic acids (such as hydrofluoric acid, hydrochloric acid and hydrobromic acid), sulphuric acid, and phosphoric acids. The free bases of formula (VIII) can be isolated and purified, if necessary, according to techniques per se known.

The compounds of the present invention exhibit a broad spectrum of antibacterial activity and are active against both Gram-positive and Gram-negative bacteria. The following families, genera and types of bacteria are representative of the activity spectrum of the compounds of the present invention.

Enterobacteriaceae: for example Escherichia, especially *Escherichia coli*; Klebsiella (especially *Klebsiella pneumoniae*) and Enterobacter; Proteus (especially *Proteus vulgaris*, *Proteus mirabilis*, *Proteus morganii* and *Proteus rettgeri*), and Salmonella (especially *Salmonella typhimurium* and *Salmonella enteritidis*); Pseudomonadaceae: *Psuedomonas aeruginosa* and Aeromonas (for example *Aeromonas liquefaciens*); Clostridia (for example *Clostridium botulinum* and *Clostridium tetani*); Micrococcaceae: for example *Staphylococcus aureus* and *Staphylococcus epidermidis*; Streptococcaceae: for example *Streptococcus pyogenes* and *Streptococcus faecalis* (Enterococcus); Mycoplasmataceae: for example *Mycoplasma pneumoniae* and *Mycoplasma arthritidis* and also Mycobacteriaceae (for example *Mycobacterium tuberculosis* and *Mycobacterium leprae*).

The excellent and broad antibacterial activity exhibited by the compounds of the present invention make them particularly useful not only in the treatment of but in the prevention of systemic and topical bacterial infections in both humans and animals.

The compounds of the present invention are also useful as feedstuff additives and are particularly useful for their growth promoting effect in animal-raising, especially in raising fatstock such as cattle, pigs and poultry. The present invention, therefore, also includes an animal feedstuff which comprises a nutritious material in combination with a growth promoting amount of a compound of the present invention. In addition, the compounds of the present invention may be administered in combination with drinking water to animals for their growth promoting effect and may also be used in fodder concentrates and in preparations which also contain vitamins and/or mineraL salts.

Thus if desired, a fodder premix containing a compound of the present invention in a growth promoting amount can be combined with an ingestible diluent or carrier and the premix is then added to the fodder immediately before the fodder is distributed to the animals.

When the compounds of the present invention are administered to humans, an antimicrobially effective amount of the compound is combined with a pharmaceutically acceptable nontoxic inert diluent or carrier.

The pharmaceutical compositions of the present invention contain a major or minor amount e.g. 99.5% to 0.1%, preferably 95% to 0.5% of at least one benzo-1,2,4-triazine as above defined in combination with a pharmaceutically acceptable nontoxic, inert diluent or carrier, the carrier comprising one or more solid, semi-solid or liquid diluent, filler and formulation adjuvant which is nontoxic, inert and pharmaceutically acceptable. Such pharmaceutical compositions are preferably in dosage unit form; i.e., physically discrete units containing a predetermined amount of the drug corresponding to a fraction or multiple of the dose which is calculated to produce the desired therapeutic response. The dosage units can contain one, two, three, four or more single doses or, alternatively, one-half, third or fourth of a single dose. A single dose preferably contains an amount sufficient to produce the desired therapeutic effect upon administration at one application of one or more dosage units according to a predetermined dosage regimen, usually a whole, half, third or quarter of the daily dosage administered once, twice, three or four times a day. Other therapeutic agents can also be present.

Although the dosage and dosage regimen must in each case be carefully adjusted, utilizing sound professional judgment and considering the age, weight and condition of the recipient, the route of administration and the nature and gravity of the illness, generally the dosage will be from 5 to 150, and preferably 25 to 75, mg/kg of body weight per day. In some instances, a sufficient therapeutic effect can be obtained at a lower dose while in others, a larger dose will be required.

Oral administration can be effected utilizing solid and liquid dosage unit forms such as powders, tablets, dragees, capsules, granulates, suspensions, solutions and the like.

Powders are prepared by comminuting the compound to a suitable fine size and mixing with a similarly comminuted pharmaceutical carrier such as an edible carbohydrate as for example starch, lactose, sucrose, glucose or mannitol. Sweetening, flavoring, preservative, dispersing and coloring agents can also be present.

Capsules are made by preparing a powder mixture as described above and filling formed gelatin sheaths. Glidants and lubricants such as colloidal silica, talc, magnesium stearate, calcium stearate or solid polyethylene glycol can be added to the powder mixture before the filling operation. A disintegrating or solubilizing agent such as agar-agar, calcium carbonate or sodium carbonate can also be added to improve the availability of the medicament when the capsule is ingested.

Tablets are formulated for example by preparing a powder mixture, granulating or slugging, adding a lubricant and disintegrant and pressing into tablets. A powder mixture is prepared by mixing the compound, suitably comminuted, with a diluent or base as described above, and optionally with a binder such as carboxymethyl, cellulose, an alginate, gelatin, or polyvinyl pyrrolidone, a solution retardant such as paraffin, a resorption accelerator such as a quaternary salt and-/or an absorption agent such as bentonite, kaolin or dicalcium phosphate. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A clear or opaque protective coating consisting of a sealing coat of shellac, a coating of sugar or polymeric material and a polish coating of wax can be provided. Dyestuffs can be added to these coatings to distinguish different unit dosages.

Oral fluids such as solutions, syrups or elixirs can be prepared in dosage unit form so that a given quantity contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the compound in a nontoxic vehicle. Solubilizers and emulsifiers such as ethoxylated isostearyl alcohols and polyoxyethylene sorbitol esters, preservatives, flavor additives such as peppermint oil or saccharin, and the like can also be added.

Where appropriate, dosage unit formulations for oral administration can be microencapsulated. The formulation can also be prepared to prolong or sustain the release as for example by coating or embedding particulate material in polymers, wax or the like.

Parenteral administration can be effected utilizing liquid dosage unit forms such as sterile solutions and suspensions intended for subcutaneous, intramuscular or intravenous injection. These are prepared by suspending or dissolving a measured amount of the compound in a nontoxic liquid vehicle suitable for injection such as an aqueous or oleaginous medium and sterilizing the suspension or solution. Alternatively, a measured amount of the compound is placed in a vial and the vial and its contents are sterilized and sealed. An accompanying vial or vehicle can be provided for mixing prior to administration. Nontoxic salts and salt solutions can be added to render the injection isotonic. Stabilizers, preservatives and emulsifiers can also be added.

Rectal administration can be effected utilizing suppositories in which the compound is admixed with low melting water soluble or insoluble solids such as polyethylene glycol, cocoa butter, higher esters as for example myristyl palmitate, or mixtures thereof.

Topical administration can be effected utilizing solid dosage unit forms such as powders or liquid or semi-liquid dosage unit forms such as solutions, suspensions, ointments, pastes, creams and gels. The powders are formulated utilizing such carriers as talc, bentonite, silicic acid, polyamide powder and the like. Liquid and semiliquid formulations can utilize such carriers, in addition to those described above, as polyethylene glycol, vegetable and mineral oils, alcohols such as isopropanol and the like. Other excipients such as emulsifiers, preservatives colorants, perfumes and the like can also be present. Formulations can also be administered as an aerosol, utilizing the usual propellants such as the chlorofluorohydrocarbons.

The preferred daily dose is 250 mg to 13.5 g, preferably 1.25 g to 6.75 g. of active ingredient.

In the case of compositions in topical application form, it is preferred that such compositions contain 0.01 to 10%, and preferably 0.1%, of active ingredient.

While the routes of administration include oral, parenteral (i.e., intramuscular, intraperitoneal, and intravenous), rectal, and topical, topical application is particularly preferred.

The antimicrobial activity of the compounds of the present invention is demonstrated by the in vitro and in vivo data set forth below;

1. In vitro experiments (Table 1)

The minimum inhibitory concentration (MIC) was determined in the plate test on a complete nutrient base of the following composition: 10 g of proteose-peptone, 10 g of veal infusion, 2 g of dextrose, 3 g of sodium chloride, 2 g of disodium phosphate, 1 g of sodium acetate, 0.01 g of adenine sulphate, 0.01 g of guanine hydrochloride, 0.01 g of uracil, 0.01 g. of xantin, 12 g of agar-agar and 1 liter of water.

The incubation temperature was 37°C and the incubation time was 24 hours.

The mycoplasmae were tested in the series dilution test (PPLO-medium) at 37°C, with observations after 18, 24 and 48 hours.

2. The compounds of Examples 1, 4 and 6 furthermore showed a minimum inhibitory concentration of 32 $\gamma$/ml of nutrient medium against *Mycobacterium tuberculosis* in the series dilution test, Jenssen egg medium, 37°C.

Table 1

| Compound from Example No: | Minimum inhibitory concentration (MIC) in γ/ml of nutrient medium Pathogens | | | | | | | | | | | |
|---|---|---|---|---|---|---|---|---|---|---|---|---|
| | Escherichia coli | | Salmonella species | Proteus vulgaris | Klebsiella | | Pseudomonas aeruginosa | | Staphylococcus aureus | Streptococcus pyogenes with serum | Mycoplasma bovirhinis | Mycoplasma gallisepticum | Mycoplasma granularum |
| | A261 | C165 | | 1017 | 8085 | 63 | B | W | 133 | | | | |
| 2 | <0.5 | <0.5 | 1 | <0.5 | <0.5 | <0.5 | 4 | 8 | <0.5 | 1 | <0.125 | <0.125 | <0.125 |
| 7 | 4 | 4 | 4 | 1 | 1 | 8 | 128 | 128 | 1 | 1 | | | |
| 3 | 4 | 4 | 4 | 1 | 1 | 4 | 128 | 128 | 1 | 128 | <0.125 | <0.125 | <0.125 |
| 4 | 8 | 8 | 8 | 8 | 4 | 128 | 128 | 128 | 8 | 8 | | | |
| 6 | 128 | 128 | 128 | 128 | 8 | 128 | 128 | 128 | 128 | 128 | | | |
| 1 | 8 | 8 | 8-16 | 128 | 8 | 128 | 8 | 128 | 8 | 128 | 1.0 | 1.0 | 1.0 |

2. In vivo experiments (Table 2)

The $ED_{50}$ was determined as the dose in mg/kg of body weight at which 50% of the white mice used as test animals survived 24 hours after intraperitoneal infection. The active compounds were administered subcutaneously 15 minutes before infection.

Table 2

| Compound from Example No: | $ED_{50}$ in mg/kg body weight of active compound Pathogens | |
|---|---|---|
| | Klebsiella 8085 | Escherichia coli C165 |
| 1 | 25 | 25 |
| 9 | 25 | — |

3. In vitro experiments

100 γ/ml of the compounds according to the invention are dissolved in Mueller-Hinton nutrient solution, with addition of 0.1% of glucose. The nutrient solution contains $1 \times 2 \times 10^5$ microbes per ml. The mixture is incubated in glass test tubes for 24 hours at 37°C and after this time the degree of turbidity is determined. If the mixture shows no turbidity after this treatment, the compound tested is considered to be effective against the particular pathogen.

On using the compounds from Examples 12, 13 and 14, the mixtures containing the following microbes remained free of turbidity:

Escherichia coli A 261
Escherichia coli 14
Escherichia coli C 165
Proteus vulgaris 1017
Klebsiella K 10
Klebsiella K 63
Salmonella species
Shigella species
Enterobacter species
Neisseria catarrhalis species
Diplococcus pneumoniae species
Streptococcus pyogenes W
Enterococcus species
Lactobacillus species
Serratia species
Proteus indole-negative, species
Proteus indole-positive, species
Pasteurella pseudotuberculosis
Brucella species
Haemophilus influenzae 281
Bordetella bronchiseptica
Bacteroides species
Staphylococcus aureus 133
Pseudomonas aeruginosa W
Pseudomonas aeruginosa B
Aeromonas hydrophila species
Corynebacterium diphtheriae gravis
Corynebacterium pyogenes M
Clostridium botulinium
Clostridium tetani
Borrelia species The compounds of Examples 12 and 13 show minimum inhibitory concentrations of 32 γ/ml of nutrient medium in the series dilution test, Jenssen egg medium, 37°C, against Mycobacterium tuberculosis.

4. In vivo experiments 12 white mice of strain $CF_1$, which had been infected intraperitoneally each with about $1.5 \times 10^8$ Staphylococcus aureus organisms, were treated 30 minutes after the infection with 50 mg/kg of the compound from Example 13 in a single oral dose. All animals survived the infection after 24 hours. Of 12 un-treated control animals, no animals survived after 24 hours.

The following non-limitative examples more particularly point out and define the present invention:

EXAMPLE 1

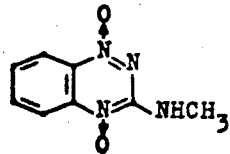

17.8 g (0.1 mol) of 3-amino-benzo-1,2,4-triazine-1,4-di-N-oxide and 15.1 g (0.12 mol) of dimethyl sulphate are suspended or dissolved, respectively, in 60 ml of dimethylformamide. A solution of 5.6 g (0.1 mol) of potassium hydroxide in 5 ml of water is added dropwise thereto. An exothermic reaction takes place and the 3-amino-benzo-1,2,4-triazine-1,4-di-N-oxide dissolves to give a blue color. After some time, the color changes to brown and orange-colored crystals separate out from the solution. 15 g (78% of theory) of 3-(N-methylamino)-benzo-1,2,4-triazine-1,4-di-N-oxide are obtained in the form of orange-colored crystals which after recrystallization from dimethylformamide/acetonitrile melt at 210°C, with decomposition.

EXAMPLE 2

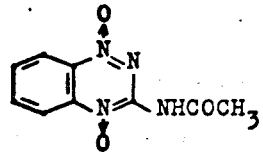

17.8 g (0.1 mol) of 3-amino-benzo-1,2,4-triazine-1,4-di-N-oxide are suspended in 100 ml of acetone and 10.2 g (0.1 mol) of acetic anhydride are added dropwise. After 4 hours the product is filtered off and 21 g (96% of theory) of 3-(N-acetylamino)-benzo-1,2,4-triazine-1,4-di-N-oxide are obtained in the form of yellow crystals which melt, with decomposition, at 200°C after recrystallization from acetonitrile.

EXAMPLE 3

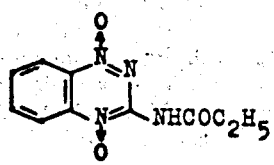

3-Amino-benzo-1,2,4-triazine-1,4-di-N-oxide and propionic anhydride yield, by a process as described in Example 2, 3-(N-propionylamino)-benzo-1,2,4-triazine-1,4-di-N-oxide of decomposition point 168°C.

EXAMPLE 4

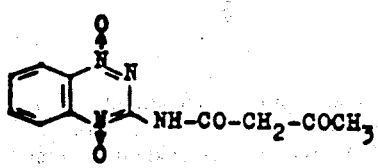

3-Amino-benzo-1,2,4-triazine-1,4-di-N-oxide and diketene yield, by the process described in Example 2, 3-(N-acetoacetylamino)-benzo-1,2,4-triazine-1,4-di-N-oxide of decomposition point 169°C.

EXAMPLE 5

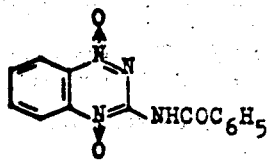

17.8 g (0.1 mol) of 3-amino-benzo-1,2,4-triazine-1,4-di-N-oxide are dissolved in a mixture of 80 ml of water and 4 g (0.1 mol) of sodium hydroxide. 10.5 g (0.1 mol) of benzoyl chloride are added dropwise to the blue solution. A weakly exothermic reaction commences and a brown precipitate separates out. This is filtered off and 25 g (89% of theory) of 3-(N-benzoylamino)-benzo-1,2,4-triazine-1,4-di-N-oxide are obtained as yellow-brown crystals which after recrystallization from dimethylformamide/acetonitrile melt, with decomposition, at 178°C.

EXAMPLE 6

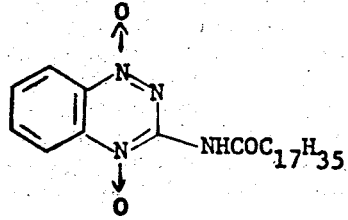

3-Amino-benzo-1,2,4-triazine-1,4-di-N-oxide and stearic acid chloride yield, by the process described in Example 5, 3-N-stearylamino-benzo-1,2,4-triazine-1,4-di-N-oxide of decomposition point 148°C.

EXAMPLE 7

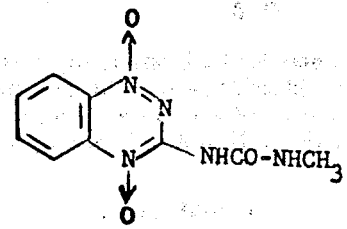

17.8 g (0.1 mol) of 3-amino-benzo-1,2,4-triazine-1,4-di-N-oxide are suspended in 100 ml of dimethylformamide and the suspension is stirred for 2 hours with 5.7 g (0.1 mol) of methylisocyanate and 2 ml of pyridine at about 55°C. After cooling the filtration, 15 g (66% of theory) of 1'-methyl-3'-[1,4-dioxo-benzo-1,2,4-triazin-3-yl]-urea are obtained in the form of yellow crystals which melt, with decomposition, at 198°C.

EXAMPLE 8

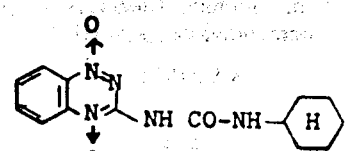

3-Amino-benzo-1,2,4-triazine-1,4-di-N-oxide and cyclohexylisocyanate yield, by the process described in Example 7, 1'-cyclohexyl-3'-[1,4-dioxo-benzo-1,2,4-triazin-3-yl]-urea of decomposition point 203°–206°C.

EXAMPLE 9

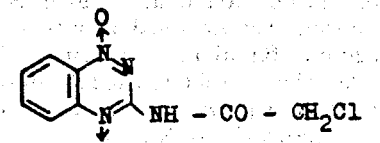

17.8 g (0.1 mol) of 3-amino-benzo-1,2,4-triazine-1,4-di-N-oxide are suspended in 100 ml of acetone and 11.3 g (0.1 mol) of chloroacetyl chloride are added. 7.9 g (0.1 mol) of pyridine are added dropwise to this suspension. The resulting precipitate is filtered off and thoroughly stirred with water. 18 g (71% of theory) of yellow crystals of 3-(N-chloroacetylamino)-benzo-1,2,4-triazine-1,4-di-N-oxide are obtained, melting, with decomposition, at 137°C after recrystallization from dimethylformamide.

EXAMPLE 10

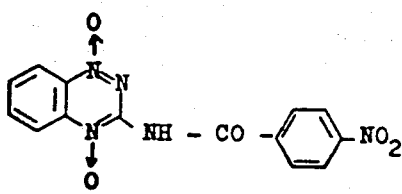

3-Amino-benzo-1,2,4-triazine-1,4-di-N-oxide and 4-nitrobenzoyl chloride yield, by the process described in Example 9, 3-(N-4'-nitrobenzoylamino)-benzo-1,2,4-triazine-1,4-di-N-oxide of decomposition point 202°C.

EXAMPLE 11

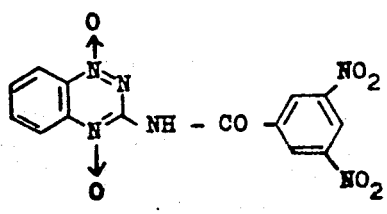

3Amino-benzo-1,2,4-triazine-1,4-di-N-oxide and 4-nitrobenzoyl chloride yield, by the process described in Example 9, 3-(N-3',5'-dinitrobenzoylamino)-benzo-1,2,4-triazine-1,4-di-N-oxide of decomposition point 205°C.

The following Example A illustrates the production of a starting compound of formula (II):

EXAMPLE A

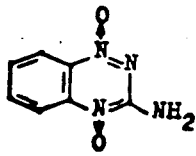

13.6 g (0.1 mol) of benzofuroxane are suspended in a mixture of 40 ml of methanol and 40 ml of H$_2$O at room temperature (about 20°C) and 17.2 g (0.2 mol) of disodium cyanamide are added in portions. Meanwhile, the temperature rises to about 50° to 60°C and the solution assumes a blue-violet color. The mixture is stirred for a further 40 minutes at about 60°C and the precipitate which has separated out is then freed of the mother liquor by filtration. The precipitate is dissolved in water, the solution is filtered and the filtrate is acidified with acetic acid. Hereupon 12.5 g of 3-amino-1,2,4-benzo-triazine-1,4-di-N-oxide (71% of theory) separate out in the form of red-golden crystals which melt, with decomposition, at 220°C.

The starting compounds used to produce the remaining compounds of the formula (II) may be produced in an analogous manner.

EXAMPLE 12

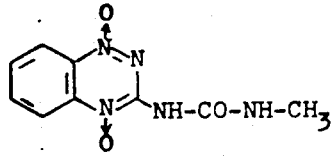

About 9 g (0.3 mol) of gaseous methylamine are passed, over the course of 1.5 hours, into a suspension of 20.4 g (0.1 mol) of 2-oxo-[1,2,4-oxa-diazolo(2,3-3,4)benzo-1,2,4-triazine]-5N-oxide in 120 ml of ethanol. An exothermic reaction takes place and produces a violet solution from which, after about 2 hours, the methylammonium salt of 1'-[1,4-dioxo-benzo-1,2,4-triazin-3-yl]-3'-methylurea precipitates. 1'-[1,4-dioxo-benzo-1,2,4-triazin-3-yl]-3'-methylurea is liberated from the ammonium salt by adding about 12 g (0.2 mol) of acetic acid.

Yield, 19 g (81% of theory) of 1'-[1,4-dioxo-benzo-1,2,4-triazin-3-yl]-3'-methylurea in the form of yellow-brown crystals which after purification by boiling in alcohol melt at 213°–215°C, with decomposition.

Analysis C$_9$H$_9$N$_5$O$_3$ (235); Calculated: C: 46.0%; H: 3.8%; N: 29.7%; Found: C: 46.0%; H: 3.8%; N: 29.2%.

EXAMPLE 13

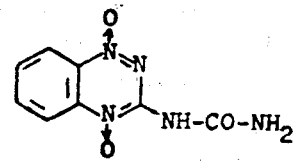

Gaseous ammonia is passed into a suspension of 20.4g (0.1 mol) of 2-oxo-[1,2,4-oxadiazolo(2,3-3,4)-benzo-1,2,4-triazine]-5-N-oxide in 100 ml of dimethylformamide for 30 minutes. The reaction temperature is kept at 25° to 30°C by cooling with ice. Thereafter the mixture is stirred for a further 2 hours and the new precipitate formed is then filtered off. Treatment of the red-brown product with water-acetic acid gives 1,4-dioxo-benzo-1,2,4-triazin-3-yl-urea in the form of yellow-brown crystals which, after purification by boiling with ethanol, melt at 216°C with decomposition. Yield 17 g (77% of theory).

Analysis: C$_8$H$_7$N$_5$O$_3$ (221); Calculated: C: 43.4%; H: 3.2%; N: 31.6%; Found: C: 43.2%; H: 3.7%; N: 31.7%.

EXAMPLE 14

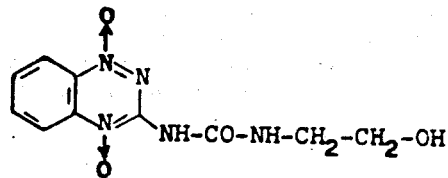

9.4 g (0.2 mol) of ethanolamine are added dropwise at 20° to 25°C, with slight cooling, to a suspension of 20.4 g (0.1 mol) of 2-oxo-[1,2,4-oxadiazolo(2,3-3,4)-benzo-1,2,4-triazine]-5-N-oxide in 180 ml of dimethylformamide. A clear solution is formed, from which a precipitate separates after a few minutes. This is filtered off after 4 hours, and dissolved in water. On neutralizing the aqueous solution with acetic acid, 18 g (68% of theory) of red-brown crystals of 1'-[1,4-dioxo-benzo-1,2,4-triazin-3-yl]-3'-[β-hydroxy-ethyl]-urea precipitate; after recrystallization from dimethylformamide, the product melts at 191° to 192°C, with decomposition.

Analysis: $C_{10}H_{11}N_5O_4$ (265) Calculated: C: 45.3%; H: 4.2%; N: 26.4%; Found: C: 45.4%; H: 4.3%; N: 26.5%.

The following 1,4-dioxo-benzo-1,2,4-triazin-3-yl-ureas of Examples 15 through 20 are produced in a manner analogous to that of Examples 12 through 14 by reacting 2-oxo-[1,2,4-oxadiazolo(2,3-3,4)-benzo-1,2,4-triazine]-5-N-oxide with the appropriate amino compound as indicated in the tables below.

TABLE 3

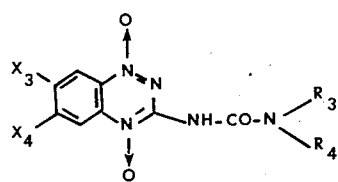

| Example No. | $X_3$ | $X_4$ | $R_3$ | $R_4$ | Color | Decomposition point (°C) |
|---|---|---|---|---|---|---|
| 15 | H | H | $CH_3$ | $CH_3$ | red-brown | 150 – 151°C |
| 16 | H | H | H | $C_2H_5$ | brown | 196 – 197°C |
| 17 | H | H | H | $C_6H_{11}$ (cyclohexyl) | red | 203 – 206°C |
| 18 | H | H | $-(CH_2)_4-$ | | red | 180 – 183°C |
| 19 | H | H | $-(CH_2)_5-$ | | red | 173 – 174°C |
| 20 | H | H | $-(CH_2)_2-$ $-O-(CH_2)_2-$ | | red | 167 – 169°C |

TABLE 4

| Reactants 2-oxo-[1,2,4-oxa-diazolo(2,3-3,4)-benzo-1,2,4-triazine]-5-N-oxide is reacted with the following amine to produce the compounds of Examples 15–20 | |
|---|---|
| Example No. | Amine |
| 15 | dimethylamine |
| 16 | ethylamine |
| 17 | cyclohexylamine |
| 18 | pyrrolidine |
| 19 | piperidine |
| 20 | morpholine |

The production of the starting compound of formula (IX) is illustrated by Example B below:

EXAMPLE B

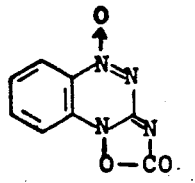

35.6 g (0.2 mol) of 3-amino-benzo-1,2,4-triazine-1,4-di-N-oxide are dissolved in 200 ml of toluene. A vigorous stream of phosgene is passed into this suspension at 90°C. After 4 hours, the reaction product is filtered off and 34 g (84% of theory) of 2-oxo-1,2,4-oxadiazolo-(2,3-a)-benzo-triazine-5-N-oxide are obtained as yellow-brown crystals which after recrystallization from acetonitrile melt at 262°C, with decomposition.

The production of the starting compound of formula (XI) may be illustrated by Example C below:

EXAMPLE C

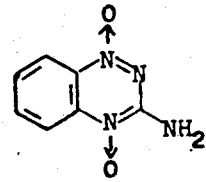

13.6 g (0.1 mol) of benzofuroxane are suspended in a mixture of 40 ml of methanol and 40 ml of $H_2O$ at room temperature (approx. 20°C) and 17.2 g (0.2 mol) of disodium cyanamide are added in portions. The temperature rises to about 50° – 60°C and the solution turns blue-violet. The mixture is stirred for a further 40 minutes at about 60°C and the precipitate which has separated out is then filtered off the mother liquor. The precipitate is dissolved in water, the solution is filtered and the filtrate is acidified with acetic acid. 12.5 g of 3-amino-1,2,4-benzo-triazine-1,4-di-N-oxide (71% of theory) then separate out in the form of red-golden crystals which melt at 220°C, with decomposition.

The remaining starting compounds and their precursors used according to the process of the present invention to produce compounds of the formula (VIII) may be produced in an analogous manner.

What is claimed is:
1. A compound of the formula:

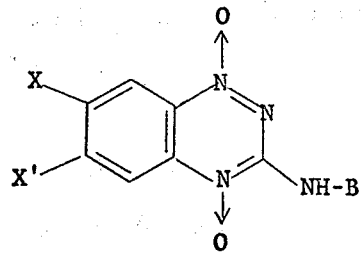

wherein
each of X and X', independently of the other, is hydrogen; halogeno, alkyl of 1 to 6 carbon atoms, unsubstituted or substituted by nitro, alkoxy of 1 to 5 carbon atoms, or up to 5 halogen atoms; or alkoxy of 1 to 6 carbon atoms, unsubstituted or substituted by halogen or nitro; and
B is alkyl of 1 to 6 carbon atoms; alkenyl of 2 to 6 carbon atoms or benzyl.

2. A compound according to claim 1 wherein each of X and X', independently of the other, is hydrogen, chloro, bromo, fluoro, methyl, ethyl, methoxy, ethoxy or trifluoromethyl; and
B is alkyl of 1 to 4 carbon atoms, allyl or benzyl.

3. The compound according to claim 1 which is:

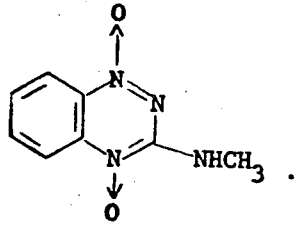

4. A compound of the formula:

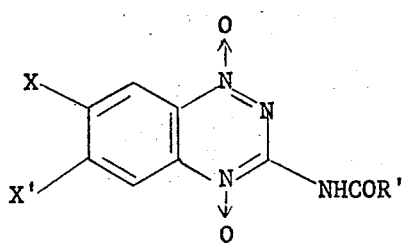

wherein
each of X and X', independently of the other, is hydrogen; halogeno, alkyl of 1 to 6 carbon atoms, unsubstituted or substituted by nitro, alkoxy of 1 to 5 carbon atoms, or up to 5 halogen atoms; or alkoxy of 1 to 6 carbon atoms, unsubstituted or substituted by halogeno or nitro; and R' is hydrogen; acetylmethyl; alkyl of 2 to 17 carbon atoms, substituted by nitro, alkoxy of 1 to 4 carbon atoms, or 1 to 5 halogen atoms; or phenyl, unsubstituted or substituted by up to two substituents selected from the group consisting of halogeno, nitro, alkyl of 1 to 4 carbon atoms and haloalkyl of 1 to 4 carbon atoms.

5. A compound according to claim 4 wherein
each of X and X', independently of the other, is hydrogen, chloro, bromo, fluoro, methyl, ethyl, methoxy, ethoxy or trifluoromethyl; and R' is hydrogen, acetylmethyl, phenyl, nitrophenyl or dinitrophenyl.

6. The compound according to claim 4 which is:

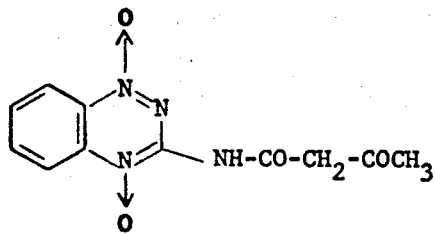

7. The compound according to claim 4 which is:

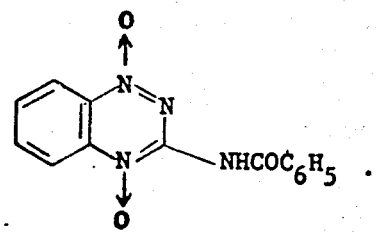

8. The compound according to claim 4 which is:

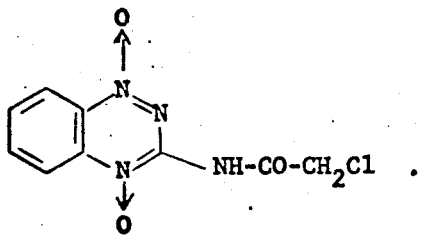

9. The compound according to claim 4 which is:

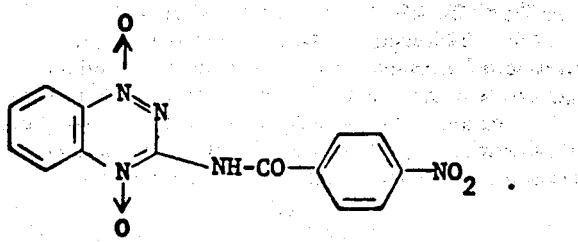

10. The compound according to claim 4 which is:

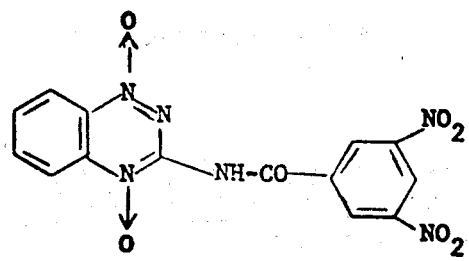

11. A compound of the formula:

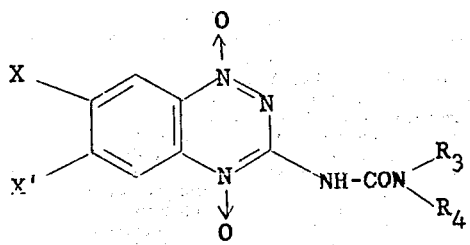

wherein
each of X and X', independently of the other, is hydrogen; halogeno, alkyl of 1 to 6 carbon atoms, unsubstituted or substituted by nitro, alkoxy of 1 to 5 carbon atoms, or up to 5 halogen atoms; or alkoxy of 1 to 6 carbon atoms, unsubstituted or substituted by halogeno or nitro; and each of $R_3$ and $R_4$, when taken separately from and independently of the other, is hydrogen, alkyl of 1 to 6 carbon atoms, unsubstituted or substituted by methoxy, ethoxy, hydroxy, halogeno, cyano, methylamino, ethylamino, dimethylamino, diethylamino, carbomethoxy or carbethoxy; alkenyl of 2 to 4 carbon atoms, unsubstituted or substituted by methoxy, ethoxy, hydroxy or halogeno;

$R_3$ is phenyl or cycloalkyl and $R_4$ is hydrogen; or $R_3$ and $R_4$, when taken collectively, together with the nitrogen atom to which they are attached, are pyrrolidino, piperidino, piperazine, hexamethyleneimino, morpholino, or N-methylpiperazino.

12. A compound according to claim 11 wherein
each of X and X', independently of the other, is hydrogen, chloro, bromo, fluoro, methyl, ethyl, methoxy, ethoxy or trifluoromethyl; and both of $R_3$ and $R_4$ are hydrogen; $R_3$ is hydrogen and $R_4$ is alkyl of 1 to 4 carbon atoms, unsubstituted or substituted by hydroxy, methoxy or ethoxy; cyclohexyl or phenyl; each of $R_3$ and $R_4$ is alkyl of 1 to 4 carbon atoms; or $R_3$ and $R_4$, taken collectively together with the nitrogen atom to which they are attached, are pyrrolidino, piperidino, piperazino, hexamethyleneimino, morpholino or N-methylpiperazino.

13. The compound according to claim 11 which is:

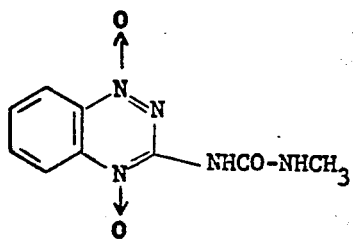

14. The compound according to claim 11 which is:

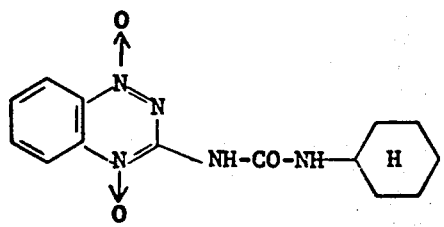

15. The compound according to claim 11 which is:

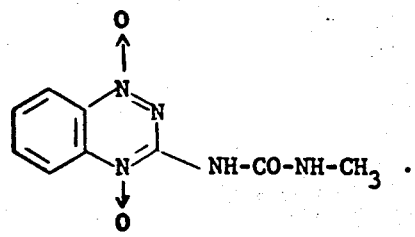

16. The compound according to claim 11 which is:

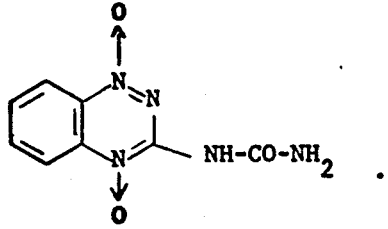

17. The compound according to claim 11 which is:

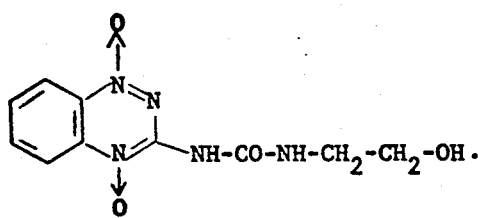

18. The compound according to claim 11 which is:

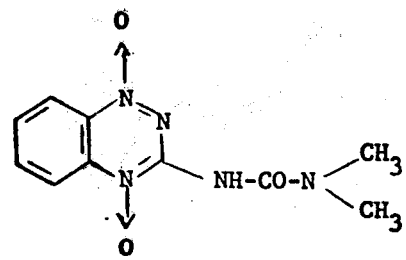

19. The compound according to claim 11 which is:

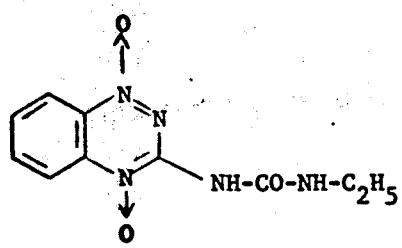

20. The compound according to claim 11 which is:

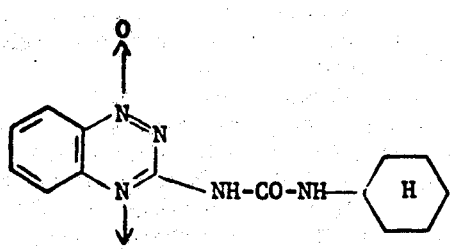

21. The compound according to claim 11 which is:

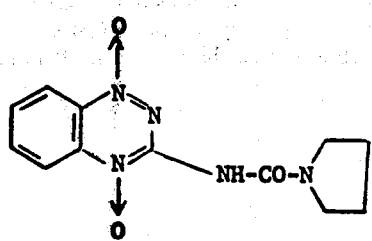

22. The compound according to claim 11 which is:

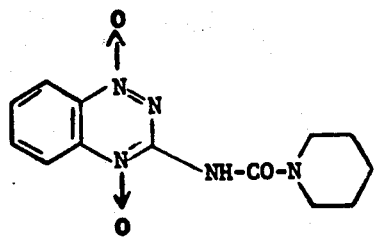

23. The compound according to claim 11 which is:

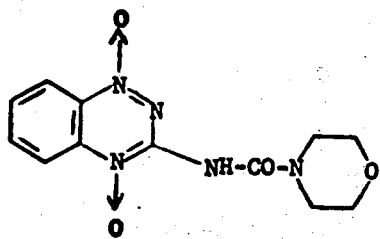

24. Process for the preparation of a compound of the formula:

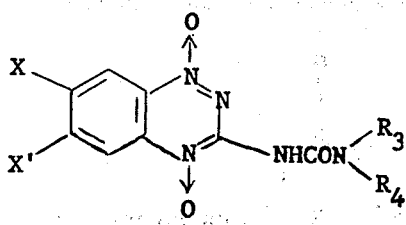

wherein
  each of X and X', independently of the other, is hydrogen, halogeno, alkyl of 1 to 6 carbon atoms, unsubstituted or substituted by nitro, alkoxy of 1 to 5 carbon atoms, or up to 5 halogen atoms; or alkoxy or 1 to 6 carbon atoms, unsubstituted or substituted by halogeno or nitro; and
  each of $R_3$ and $R_4$, when taken separately from and independently of the other, is hydrogen, alkyl of 1 to 6 carbon atoms, unsubstituted or substituted by methoxy, ethoxy, hydroxy, halogeno, cyano, methylamino, ethylamino, dimethylamino, diethylamino, carbomethoxy or carbethoxy; alkenyl of 2 to 4 carbon atoms, unsubstituted or substituted by methoxy, ethoxy, hydroxy or halogeno;
  $R_3$ is phenyl or cycloalkyl and $R_4$ is hydrogen; or
  $R_3$ and $R_4$, when taken collectively, together with the nitrogen atom to which they are attached, are pyrrolidino, piperidino, piperazino, hexamethyleneimino, morpholino, or N-methylpiperazino, which comprises reacting an N-oxide of the formula:

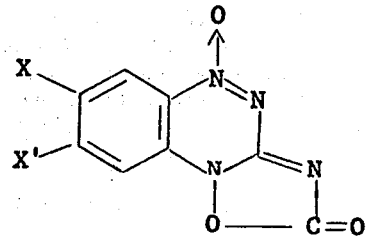

in which X and X' are as herein defined with an amine of the formula

in which $R_3$ and $R_4$ are as herein defined at temperatures of from 0°C to 150°C.

25. A process according to claim 24 wherein an inert organic solvent or water is used as a diluent.

26. A process according to claim 25 wherein the diluent is a polar organic solvent, a nitrile, dimethylformamide, an ether, a heteroaromatic compound, nitrobenzene or a mixture thereof.

27. A process according to claim 25 wherein the diluent is an excess of amine.

28. A process as defined in claim 24 wherein the product is precipitated in the form of its ammonium salt and the ammonium salt is treated with a suitable organic or inorganic acid to produce the free base.

29. A process as defined in claim 24 wherein the temperature is between 20°C and 80°C.

30. A process as defined in claim 24 wherein the reaction is carried out at atmospheric pressure.

31. A process as defined in claim 24 wherein the reaction is carried out at elevated pressure.

32. A process as defined in claim 24 which comprises reacting at least 1 mol of amine per mol of N-oxide.

33. A process as defined in claim 32 wherein 1 to 20 mols of amino compound are used per mol of N-oxide.

34. A process as defined in claim 33 wherein 2 to 5 mols of amino compound are used per mol of N-oxide.

* * * * *